United States Patent [19]

Arakawa

[11] Patent Number: 5,436,550
[45] Date of Patent: Jul. 25, 1995

[54] AC-DC CONVERTER HAVING SAW-TOOTH WAVE GENERATING CIRCUIT IN ACTIVE FILTER

[75] Inventor: Koji Arakawa, Kawagoe, Japan
[73] Assignee: Tokyo, Inc., Tokyo, Japan
[21] Appl. No.: 182,290
[22] Filed: Jan. 14, 1994
[30] Foreign Application Priority Data
  Jan. 22, 1993 [JP] Japan .................. 5-027476
[51] Int. Cl.[6] ................................ G05F 1/10
[52] U.S. Cl. .................. 323/222; 323/288; 323/266
[58] Field of Search .............. 323/222, 235, 265, 266, 323/282, 287, 288; 363/16, 17, 18–21, 78–80, 97, 127, 131

[56] References Cited
U.S. PATENT DOCUMENTS

| | | | |
|---|---|---|---|
| 4,307,441 | 12/1981 | Bello | 363/97 |
| 4,355,277 | 10/1982 | Davis et al. | 323/222 |
| 4,975,820 | 12/1990 | Szepesi | 363/21 |
| 5,164,890 | 11/1992 | Nakagawa et al. | 363/17 |
| 5,305,191 | 4/1994 | Loftus | 363/17 |

Primary Examiner—Peter S. Wong
Assistant Examiner—Matthew V. Nguyen
Attorney, Agent, or Firm—Dressler, Goldsmith, Shore & Milnamow, Ltd.

[57] ABSTRACT

This invention provides an AC-DC converter in which the shape and the cost do not increase by a measure for a harmonic distortion in the power factor improved AC-DC converter generating little harmonic distortion. In the AC-DC converter, a control input terminal of a switching transistor of an active filter is connected to an output terminal of a flip-flop, a set input terminal of which is connected to a DC-DC converter to receive a synchronizing pulse signal therefrom. A reset input terminal of the flip-flop is connected to an output terminal of a comparator to receive an OFF-timing signal from the comparator. The comparator determines OFF-timing of the switching transistor by comparing a level voltage with an outout voltage from a saw-tooth wave generating circuit. Thereby since it is not required that an active filter has a multiplier and an an oscillating circuit, its circuit construction is simple and the AC-DC converter in small size and at low cost is realized.

5 Claims, 5 Drawing Sheets

PRIOR ART

5,436,550

AC-DC CONVERTER HAVING SAW-TOOTH WAVE GENERATING CIRCUIT IN ACTIVE FILTER

BACKGROUND OF THE INVENTION

Field of the Invention

The present invention relates to an AC-DC converter which is improved to increase the power factor and to reduce generation of higher harmonics of a commercial power line.

A rectifier/smoothing circuit of capacitor-input type has been used as means for rectifying an A.C. input of an AC-DC converter circuit of various types of electronic apparatus, by means of its simple construction. In recent years, however, a problem has been reported in which higher harmonics are undesirably generated in commercial power line by electronic apparatus having a rectifier/smoothing circuit of capacitor-input type, resulting in erroneous operation of other electronic apparatus connected to the same power line.

This has given a rise to the demand for power-factor improved AC-DC converter in which generation of higher harmonics is suppressed. To cope with this demand, the AC-DC converters have been proposed which employs various measures for improving power factor.

Figure 7:
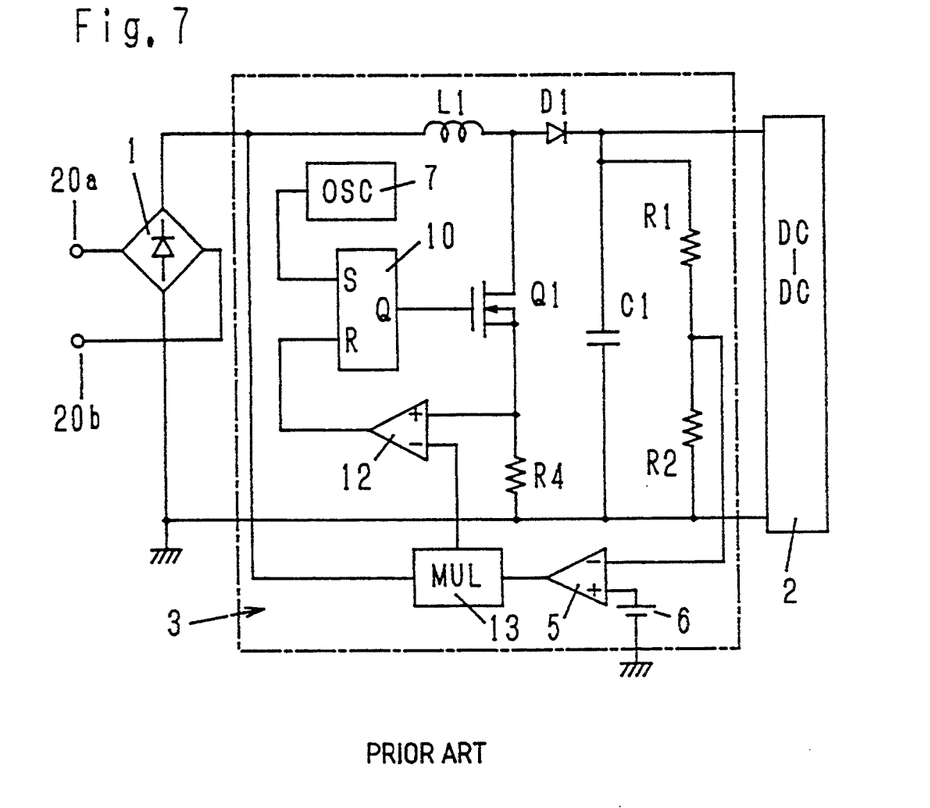
FIG. 7 is an conventional power factor improved AC-DC converter.

FIG. 7 shows the circuit of a known AC-DC converter of improved power factor type. The AC-DC converter as shown in FIG. 7 has the following circuit construction. A.C. input terminals of a rectifier circuit 1 is connected to a commercial power line through input terminals 20a, 20b of the converter. Output terminals of the rectifier circuit 1 are connected to input terminals of an active filter 3, output terminals of which are connected to input terminals of a DC-DC converter 2. A detailed circuit construction of the DC-DC converter 2 and a load connected to its outputs are omitted.

The active filter 3 of the AC-DC converter as shown in FIG. 7 has the following circuit construction.

A choke coil L1 and a diode D1 are connected between a higher potential output terminal of the rectifier circuit 1 and a higher potential input terminl of the DC-DC converter 2. The forward direction of the diode D1 is determined such that current is allowed to flow from the choke coil L1 to the DC-DC converter 2.

A lower potential output terminal of the rectifier circuit 1 is connected to a lower potential input terminal of the DC-DC converter 2 and the ground. A series circuit of a principal current path of a switching transistor Q1 and a resistor R4 is connected between the anode of diode D1 and the lower potential output terminal of rectifier 1. An output capacitor C1 is connected between the cathode of diode D1 and the lower potential output terminal of rectifier 1, and a series circuit of resistors R1 and R2 is connected in parallel across the output capacitor C1.

A negative input terminal of a voltage error amplifier 5 is connected to a connecting point of the resistors R1 and R2. A positive input terminal of the voltage error amplifier 5 is connected to a reference voltage source 6, and its output terminal is connected to one of input terminals of a multiplier circuit 13.

Another input terminal of the multiplier circuit 13 is connected to the higher potential output terminal of the rectifier 1, an output terminal of which is connected to a negative input terminal of a comparator 12. A positive input terminal of the comparator 12 is connected to a connecting point of the switching transistor Q1 and a resistor R4, an output terminal of which is connected to a reset input terminal (R) of a flip-flop 10. A set input terminal (S) of a flip-flop 10 is connected to an output of an oscillator 7, and an output terminal (Q) of the flip-flop 10 is connected to a gate of the transistor Q1.

A following description will now be given of the operation under the foregoing circuit construction.

When a switching pulse outputted from the oscillator 7 starts to rise so that a voltage is inputted to the input terminal (S) of the flip-flop 10, a voltage of the output terminal (Q) of the flip-flop 10 rises up and the switching transistor Q1 turns on.

When the switching transistor Q1 is at ON state, current flows through choke coil L1, switching transistor Q1 and resistor R4. This current is in inverse proportion to inductance of the choke coil L1 and its value gradually increases in proportion to time that an voltage is applied.

This current value is detected as voltage value through the resistor R4 which is inputted to one of the input terminals of the comparator 12. When this detected voltage value is greater than a voltage value of a control signal from the multiplier circuit 13, a voltge at the output terminal of the comparator 12 rises. The control signal from the multiplier circuit is determined by both an output voltage of the rectifier 1 and the output of the voltage error amplifier 5.

This output of the voltage error amplifier 5 is in proportion to the difference of a voltage which is obtained by dividing the voltage across the output capacitor by resistors R1 and R2 and the reference voltage of the reference voltage source 6.

When the voltage which has risen at an output of the comparator 12 is inputted to the reset input terminal (R) of the flip-flop 10, the voltage of the output terminal (Q) falls and the switching transistor Q1 turns on.

As described above, the conventional AC-DC converter can easily realize a high power factor. The converter, however, becomes complicated and increases in size because a multiplier circuit is needed as a circuit component.

In order that an oscillator is used for driving a circuit in both the active filter and the DC-DC converter, many circuit elements are needed and an apparatus become large in size. In addition to this, the AC-DC converter has disadvantage of increasing EMI by means of its oscillating pulse because there exist a plurality of oscillators therein.

SUMMARY OF THE INVENTION

It is an object of the invention to provide a AC-DC converter in which the shape and the cost do not increase by a measure for a harmonic distortion in the power factor improved AC-DC converter generating little harmonic distortion.

In order to achieve this object, the present invention provides an AC-DC converter comprising: a rectifier for rectifying an A.C. input voltage from a commercial power line; an active filter for obtaining higher voltage by boosting up an output voltage of the rectifier; and a DC-DC converter supplied a stable D.C. output voltage to a load, the active filter being characterized in that a switching transistor is turned on by trigger of a synchronizing pulse signal as synchronised with a switching pulse for driving the DC-DC converter; a difference between a voltage across an output capacitor and the reference voltage is detected; a level voltage is changed by the difference; a saw-tooth wave voltage outputted from a saw-tooth-wave generating circuit in which the voltage is risen by an input of the synchronising pulse signal is compared with the changed voltage level or a saw-tooth wave whose inclination is changed is compared with the voltage level and off-timing of the switching transistor is determined.

DESCRIPTION OF THE PREFERRED EMBODIMENT

Figure 1:
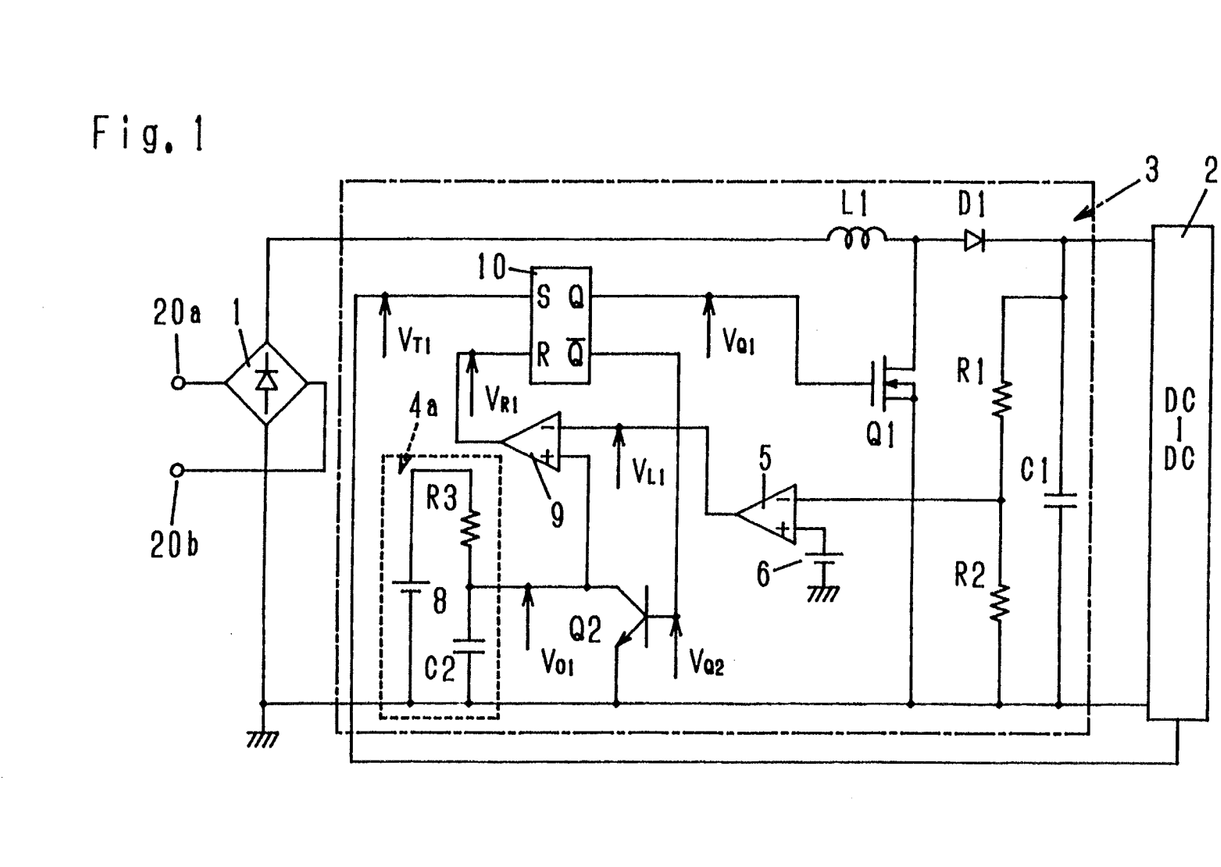
FIG. 1 shows an AC-DC converter according to the present invention.

FIG. 1 shows an AC-DC converter according to the present invention.

The parts and components which are the same as those in the conventional converter as shown in FIG. 7 are denoted by the same reference numerals as those in FIG. 1.

In FIG. 1, A.C. input terminals of a rectifier 1 are connected to an A.C. power line through input terminals 20$a$, 20$b$ of the AC-DC converter. D.C. output terminals of the rectifier 1 are connected to input terminals of an active filter 3 and the lower potential terminal of the D.C. output terminals is grounded. Output terminals of the active filter 3 are connected to input terminals of a DC-DC converter 2.

A circuit construction of the active filter is as follows.

A series circuit of a choke coil L1 and a diode D1 is connected between the high potential output terminal of rectifier 1 and the high potential input terminal of DC-DC converter 2. The diode D1 has such a forward direction as to permit electrical current to flow from the choke coil L1 to DC-DC converter 2.

A pricipal current path of a switching transistor Q1 is connected between the anode of diode D1 and the ground. An output capacitor C1 is connected between the cathode of diode D1 and the ground. A series circuit of resistors R1 and R2 for a voltage divider is connected in parallel to the output capacitor C1.

The gate of switching transistor Q1 is connected to an output terminal (Q) of a flip-flop 10. A set input terminal (S) of the flip-flop 10 is connected to DC-DC converter 2 so that a synchronizing pulse signal synchronized with a switching pulse of DC-DC converter 2 is inputted to the set input terminal (S). A reset input terminal (R) of the flip-flop 10 is connected to an output terminal of a comparator 9 and an inverting output terminal (not Q) is connected to the base of transistor Q2. The emitter of transistor Q2 is grounded, the collector of which is connected to a connecting point of a resistor R3 and a capacitor C2 of a saw-tooth wave generating circuit 4$a$.

The saw-tooth wave generating circuit 4$a$ has a series circuit of the resistor R3 and capacitor C2 connected between electrodes of a constant voltage source 8 in which the lower potential electrode is grounded. The positive input terminal of comparator 9 is connected to the collector of transistor Q2, the negative input terminal of which is connected to an output terminal of a voltage error amplifier 5.

The positive input terminal of the voltage error amplifier 5 is connected to a reference voltage source 6, the negative input terminal of which is connected to a connecting point of resistors R1 and R2.

Figure 2:
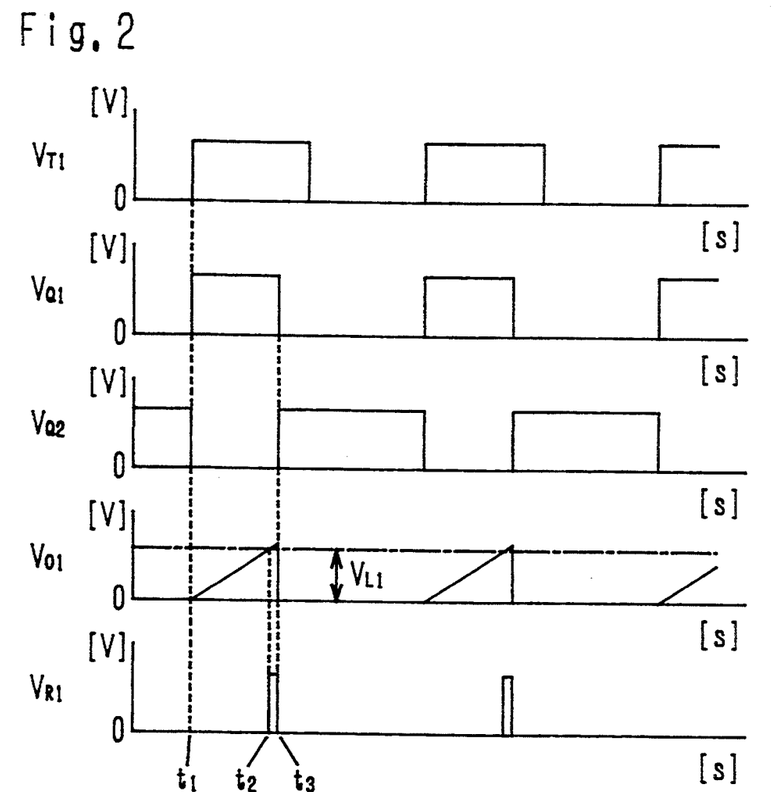
FIG. 2 shows voltage waveforms at each point of the circuit as illustrated in FIG. 1.

Referring to waveforms in each point of the circuit shown in FIG. 2, the operation of the circuit according to the invention will now be described as follows.

Based on a synchronizing pulse signal synchronized with a switching pulse of the DC-DC converter 2 at a moment time $t_1$, a voltage $V_{T1}$, inputted to the set input terminal of flip-flop 10 starts to rise. The flip-flop 10 rised an output voltage $V_{Q1}$ at a moment at which a high voltage $V_{T1}$ is inputted to the set input terminal and causes to falls an output voltage $V_{Q2}$ of the inverting output terminal. The rise of voltage $V_{Q1}$ causes the switching transistor Q1 to turn on and the fall of voltage $V_{Q2}$ causes the transistor Q2 to turn off.

When the transistor Q2 turns off, the capacitor C2 of the saw-tooth wave generating circuit 4$a$ starts to charge according to the constant voltage source 8 and the voltage $V_{01}$ gradually increases. This $V_{01}$ is inputted to the positive input terminal of comparator 9 which is compared with the output voltage $V_{L1}$ of the voltage error amplifier 5 inputted to the negative input terminal of comparator 9.

The output voltage $V_{L1}$ of voltage error amplifier 5 is a voltage corresponding to a difference between the reference voltage and a charged voltage of output capacitor C1 divided by the resistors R1 and R2.

When the voltage $V_{01}$ becomes greater than the level voltage $V_{L1}$ at a moment time $t_2$, the voltage $V_{R1}$ outputted from the comparator 9 rises and is inputted to the reset input terminal of flip-flop 10. When a high voltage $V_{R1}$ is inputted to the reset input terminal, the flip-flop 10 falls the output voltage $V_{Q1}$ of the output terminal and rised the output voltage $V_{Q2}$ of the inverting output terminal. When the voltage $V_{Q1}$ falls, the switching transistor Q1 turns off and when the voltage $V_{Q2}$ rises, the switching transistor Q2 turns on.

The connecting point of the resistor R3 and the capacitor C2 of the saw-tooth wave generating circuit 4$a$ is grounded due to the turning-on of the transistor Q2, the voltge $V_{01}$ drops and then the capacitor C2 starts to discharge.

The level voltage $V_{L1}$ becomes larger due to the drop of the voltage $V_{01}$, and the output voltage $V_{R1}$ of the comparator 9 drops. The voltage $V_{R1}$ for turning off the switching transistor Q1 is generated and OFF-timing of switching transistor Q1 is determined due to the comparing operation of this saw-tooth wave voltage $V_{01}$ with level voltage $V_{L1}$.

Figure 3:
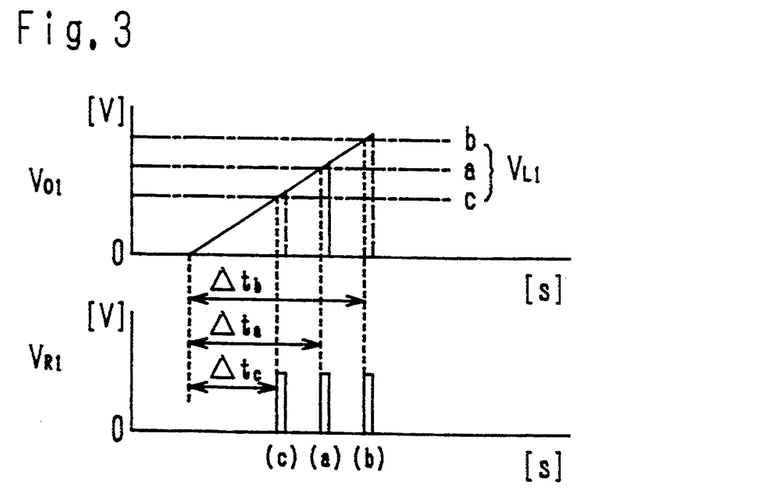
FIG. 3 is a drawing for explaining ON duration control of the switching transistor as shown in FIG. 1.

Waveforms of the voltages $V_{01}$, $V_{L1}$ and $V_{R1}$ are shown in FIG. 3. Referring to FIG. 3, ON duration control of the switching elements shown in FIG. 1 will be now described as follows.

Now, when the output capacitor C1 is charged to a certain voltage and the AC-DC converter continues a stable operation, the level voltage $V_{L1}$ stabilizes in the state as shown in "a" of FIG. 3 and ON duration of the switching transistor Q1 is $\Delta t_a$. When a charged voltage of the output capacitor C1 becomes low, the difference with the reference voltage of the reference voltage source 6 becomes greater and the level voltage $V_{L1}$ outputted from the voltalge error amplifier 5 becomes higher.

When the level voltage $V_{L1}$ is high, as shown in "b" of FIG. 3 it will take more time until voltage $V_{01}$ is higher than voltage $V_{L1}$ and ON duration $\Delta t_b$ of switching transistor Q1 is longer.

On the contrary, when the charged voltage of output capacitor C1 is high, the difference with the reference voltage of the reference voltage source 6 is small and the level voltage $V_{L1}$ becomes low. When the level voltage $V_{L1}$ is low, voltage $V_{01}$ can be higher than voltage $V_{L1}$ immediately as shown in "c" of FIG. 3 and ON duration of switching transistor Q1 is small like $\Delta t_c$. The above-mentioned operation is repeated and the active filter is driven so that the charged voltage of capacitor C1 is constant. At this time if the inductance of choke coil L1 and the charaged voltage of output capacitor C1 are regulated so that the current flow always starts from zero, an average value of the current that flows though the choke coil L1 is proportional to the rectified sine waveform voltage.

Figure 4:
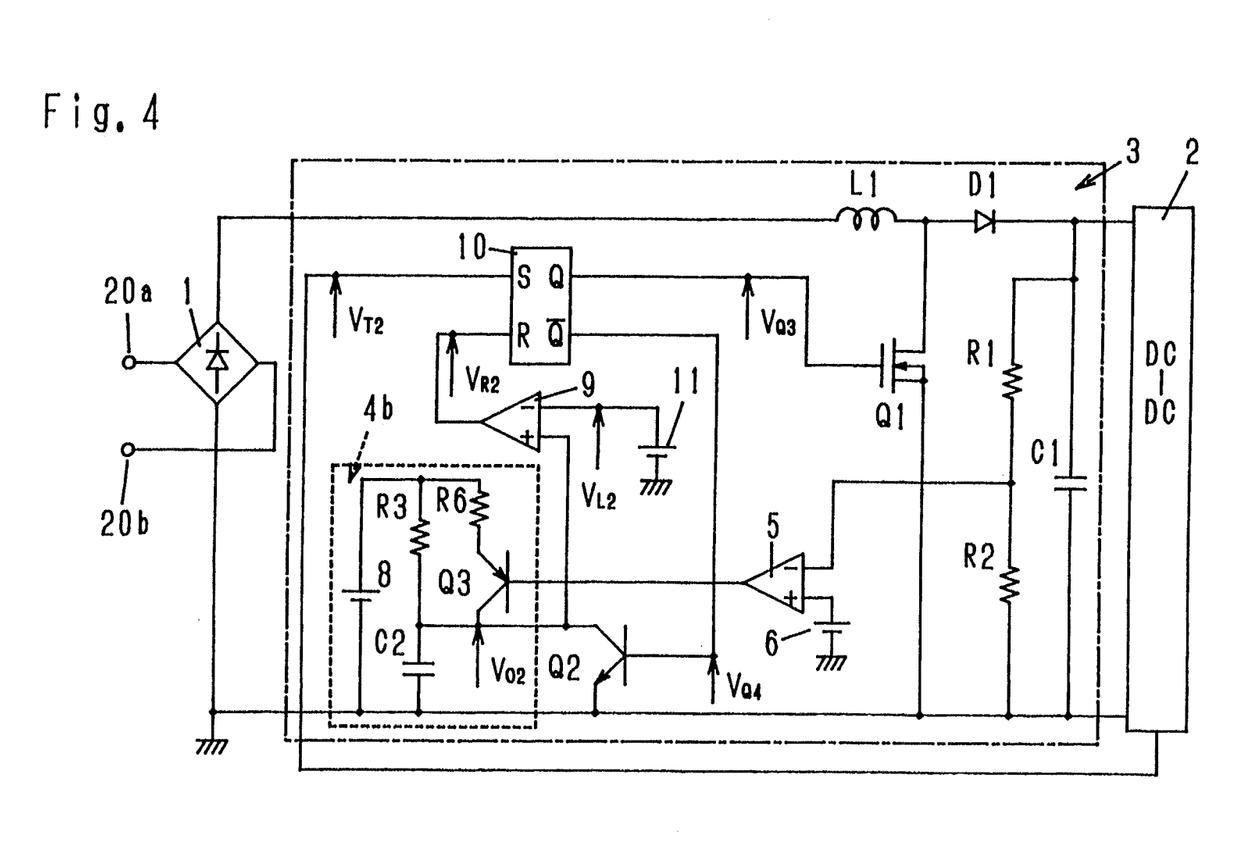
FIG. 4 shows another AC-DC converter according to the present invention.

FIG. 4 shows another embodiment of the AC-DC converter according to the present invention. The parts and components which are the same as those in the converter as shown in FIG. 4 are denoted by the same reference numerals as those in FIG. 1 and FIG. 7.

In FIG. 4 a rectifier 1, an active filter 3, a construction of an DC-DC converter circuit 2 and a circuit construction of the active filter 3 having a choke coil L1, a diode D1, a switching transistor Q1, an output capacitor C1 and resistors R1 and R2 for a voltage divider are the same as that of FIG. 1.

The active filter has the following circuit construction. The gate of a switching transistor Q1 is connected to an output of a flip-flop 10. A set input terminal of the flip-flop 10 is connected to a DC-DC converter and thereby synchronizing pulses signal synchronized with swithing pulses of the DC-DC converter 2 are inputted to the set input terminal.

A reset input terminal of flip-flop 10 is connected to an output terminal of a comparator 9, an inverting output terminal of which is connected to the base of transistor Q2. The positive input terminal of comparator 9 is connected to the collector of transistor Q2, the negative input terminal of which is connected to a reference voltage source 11. The emitter of transistor Q2 is grounded, the collector of which is connected to the connecting point of a resistor R3 and a capacitor C2 of a saw-tooth wave generating circuit 4b.

In the saw-tooth wave generating circuit 4b, a series circuit of the R3 and capacitor C2 is connected in parallel across a constant voltage source 8, the low potential electrode of which is grounded, and a series circuit of the R6 and the emitter and collector of a pnp transistor Q3 is connected across resistor R3.

The base of transistor Q3 is connected to an output of voltage error amplifier 5. The negative input terminal of voltage error amplifier 5 is connected to a connecting point of the resistors R1 and R2 for a divider, the positive input terminal of which is connected to the reference voltage source 6.

Figure 5:
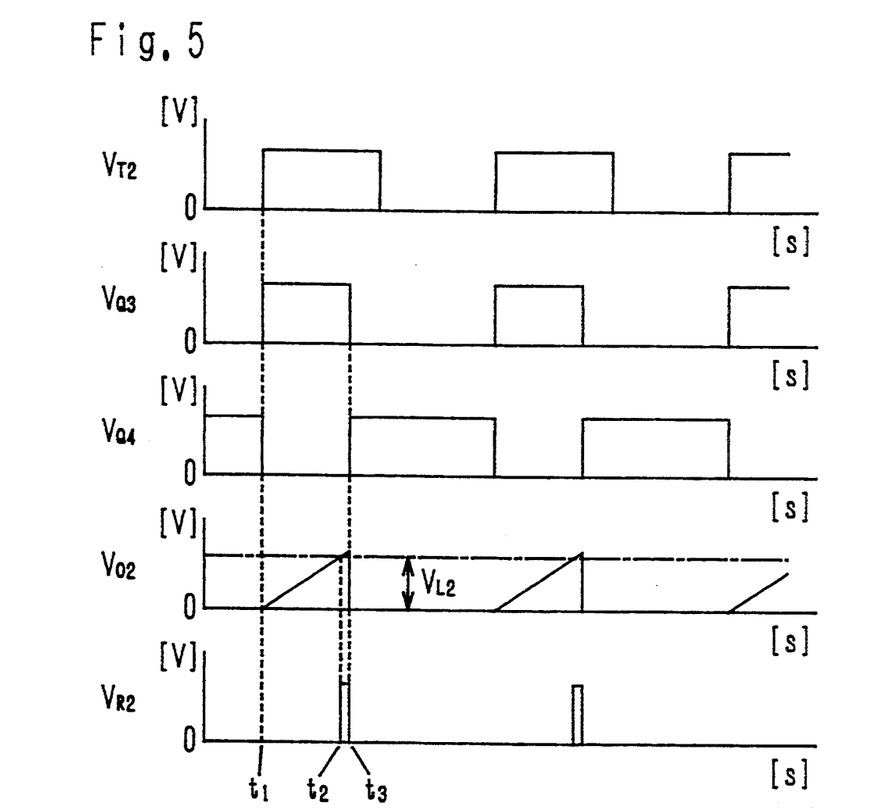
FIG. 5 shows voltage waveforms at each point of the circuit as illustrated in FIG. 4.

Referring to waveforms at each point of the circiut shown in FIG. 5, the operation of the circuit construction as described above will be now explained.

A voltage $V_{T2}$ inputted to the set input terminal of the flip-flop 10 rises due to synchronizing pulses synchronized with switching pulses from the DC-DC converter 2 at a moment time $t_1$. At time that a high voltage $V_{T2}$ is inputted to the set input terminal of the flip-flop 10, an output voltage $V_{Q3}$ of the output terminal of the flip-flop 10 rises and an output voltage $V_{Q4}$ of the inverting output terminal of the flip-flop 10 drops. The switching transistor Q1 turns on due to rise of the $V_{Q3}$ and turns off due to fall of the $V_{Q4}$.

When the transistor Q2 turns off, the capacitor C2 of the saw-tooth wave generating circuit 4b is charged through the constant voltage source 8 and the voltage $V_{O2}$ gradually increases. An increasing rate of the voltage $V_{O2}$ can be controlled by inputting a voltage indicating the difference between a divided voltage of the charged voltage of the output capacitor C1 and a voltage of the reference voltage source 6 from the voltage error amplifier 5 to the base of transistor Q3.

The $V_{O2}$ is inputted to the positive potential input terminal of the comparator 9 and is compared with the level voltage $V_{L2}$ of the reference voltage source 11 inputted to the negative potential input terminal of comparator 9. When the voltage $V_{O2}$ becomes greater than the voltage $V_{L2}$ at a moment time $t_2$, the voltage $V_{R2}$ outputted from the comparator 9 rises and is inputted to the reset input terminal of flip-flop 10. When the voltage $V_{R2}$ is inputted to the reset input terminal of flip-flop 10, the output voltage $V_{Q3}$ of its output terminal falls and the output voltage $V_{Q4}$ of the inverting output terminal rises.

The switching transistor Q1 turns off due to the fall of the volatage $V_{Q3}$ and the transistor Q2 turns on due to the rise of the voltage $V_{Q4}$. Based on a turn-on of the transistor Q2, the connecting point of the resistor R3 and capacitor C2 of saw-tooth generating circuit 4b is grounded, the voltage $V_{O2}$ falls and the capacitor C2 starts to discharge. Since the voltage $V_{L2}$ becomes greater when the voltage $V_{O2}$ falls, the voltage $V_{R2}$ outputted from the comparator 9 falls. The voltage $V_{R2}$ for turning off the switching transistor Q1 is generated, based on the oparation for comparing this saw-tooth wave voltage $V_{O2}$ with the level voltage $V_{L2}$ and OFF-timing of switching transistor Q1 is determined.

Both of the circuits as shown in FIG. 1 and FIG. 3 are the same in determining OFF-timing of switching transistor Q1 by comparing the $V_{O1}$ and the $V_{O2}$ of the saw-tooth voltage waveform with the level voltage $V_L$. However, in the circuit as illustrated in FIG. 1, ON duration of switching trasistor Q1 is controlled by changing a value of the level voltage $V_L$ in according with the charging voltage value of output capacitor C1, while in the circuit as illustrated in FIG. 3, it is done by changing the inclination of saw-tooth wave voltage $V_0$ in accordance with the charging voltage value of the C1.

FIG. 1 shows each waveform of the voltages $V_{O2}$, $V_{L2}$ and $V_{R2}$. Referring to FIG. 1, ON duration control of a switching element in a circuit as shown in FIG. 3 will be described as follows.

Figure 6:
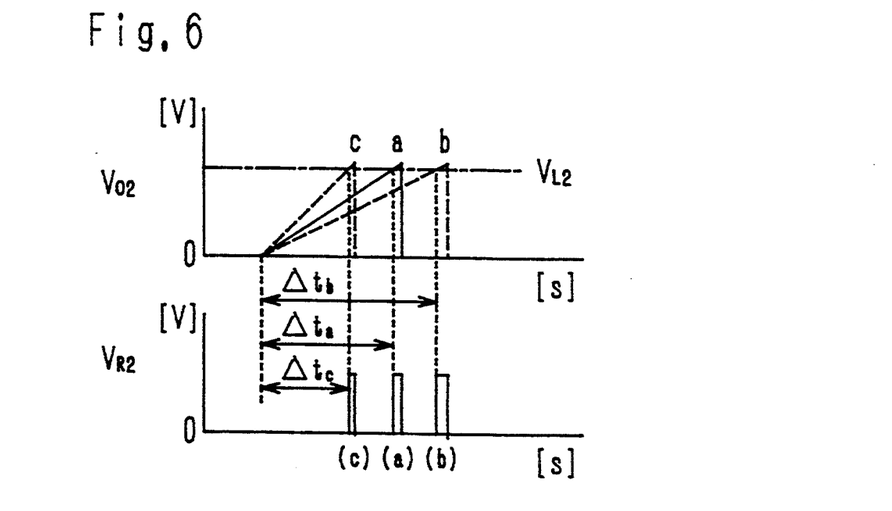
FIG. 6 is a drawing for explaining ON duration contral of the switching transistor as shown in FIG. 4.

Now, if the output capacitor C1 has been charged up to a certain voltage and the AC-DC converter continues to operate in the stable state, the voltage $V_{O2}$ is stable in the state as shown in "a" of FIG. 6 and ON duration of the switching transistor Q1 is $\Delta t_a$, where the charging voltage of the C1 becomes lower, the difference between the reference voltage becomes greater and the voltage inputted to the base of the Q3 from the voltage error amplifier 5 is higher, so that the total resistance of the resistors R3, R6 and transistor Q3 is getting high and the charging rate of the C2 slow.

At this time the slope of the waveform of the $V_{O2}$ is gentle as shown in "b" of FIG. 6 and it will take more time for the $V_{O2}$ to be greater than the $V_{L2}$, so that ON duration $\Delta t_b$ of the Q1 is getting longer.

On the contrary if the charging voltage of the C1 is high, the difference between the reference voltage is small and the voltage inputted to the base of the Q3 from the voltage error amplifier 5 is smaller, so that the total resistance of the resistors R3, R6 and transistor Q3 is getting low and the charging rate of the C2 rapid.

At this time the slope of the waveform of the $V_{O2}$ is steep as shown in "c" of FIG. 6 and the $V_{O2}$ becomes immediately greater than the $V_{L2}$, so that ON duration $\Delta t_c$ of the Q1 is getting shorter.

The operation as mentioned above is repeated and the active filter 3 is controlled so as to keep the charging voltage of the C1 constant.

As described above, this invention is characterized in that the switching transistor of the active filter turns on by a trigger of a synchronizing pulse signal synchronized with a switching pulse driving the DC-DC converter and OFF-timing of the switching transistor is determined by comparing the voltage outputted from a saw-tooth wave generating circuit with the level voltage. Thereby since it is not required that an active filter has a multiplier and an oscillating circuit, its circuit construction is simple and the AC-DC converter in small size and at low cost is realized.

Further, a noise of EMI based on output pulses from the oscillator decreases because there exists the oscillator only in the DC-DC converter and no oscillator in the active filter.

What is claimed

1. An AC-DC converter comprising:
   a rectifier for rectifying an A.C. input voltage supplied from a commercial power line;
   an active filter for obtaining higher voltage by boosting up the level of an output voltage from the rectifier; and
   a DC-DC converter for supplying a stable D.C. output voltage to a load,
   wherein the active filter comprises:
      a driving circuit for driving a switching transistor by trigger of a synchronizing pulse signal as synchronized with a switching pulse for driving the DC-DC converter; and
      a saw-tooth wave generating circuit without a function of self-oscillation, in which a value of the output voltage together with the turn-on of the switching transistor starts rising, in response to a signal which the driving circuit outputs when the synchronizing pulse signal is inputted thereto,
      and the active filter is characterized in that ON-timing of the switching transistor is determined at the time when it is triggered by the synchronizing pulse signal, and
      OFF-timing of the switching transistor is determined by comparing a saw-tooth wave voltage outputted from the saw-tooth wave generating circuit with a level voltage as reference to keep the D.C. output voltage constant.

2. An AC-DC converter comprising:
   a rectifier for rectifying an A.C. input voltage supplied from a commercial power line;
   an active filter for obtaining higher voltage by boosting up the level of an output voltage from the rectifier; and
   a DC-DC converter for supplying a stable D.C. output voltage to a load,
   wherein the active filter comprises:
      a driving circuit for driving a switching transistor by trigger of a synchronizing pulse signal as synchronized with a switching pulse for driving the DC-DC converter; and
      a saw-tooth wave generating circuit without a function of self-oscillation, in which a value of the output voltage together with the turn-on of the switching transistor starts rising, in response to a signal which the driving circuit outputs when a synchronizing pulse signal is inputted thereto.
      and the active filter is characterized in that
      ON-timing of the switching transistor is determined at the time when it is triggered by the synchronizing pulse signal, and
      OFF-timing of the switching transistor is determined by comparing a saw-tooth wave voltage outputted from the saw-tooth wave generating circuit with a level voltage as reference to keep the D.C. output voltage constant, and
      a value of the level voltage changes in accordance with a difference between a voltage across both terminals of an output capacitor and the reference voltage.

3. An AC-DC converter comprising:
   a rectifier for rectifying an A.C. input voltage supplied from a commercial power line;
   an active filter for obtaining higher voltage by boosting up the level of an output voltage from the rectifier; and
   a DC-DC converter for supplying a stable D.C. output voltage to a load,
   wherein the active filter comprises a control circuit including:
      a saw-tooth wave generating circuit being formed by connecting a resistor and a capacitor in series between electrodes of a constant voltage source in which a low potential side of the electrodes is grounded;
      a connecting point of the resistor and the capacitor being connected to one of input terminals of a comparator;
      the other input terminal of the comparator being connected to an output terminal of a voltage error amplifier outputting a level voltage according to a difference between a voltage across both terminals of an output capacitor and a reference voltage;
      an output terminal of the comparator being connected to a reset input terminal of a flip-flop, a synchronizing pulse signal as synchronized with a switching pulse for driving the DC-DC converter being inputted to a set input terminal of the flip-flop, an output terminal of the flip-flop being connected to a control electrode of the switching transistor; and
      an inverting output terminal of the flip-flop being connected to a control electrode of another transistor, a main current flow path thereof being connected across the capacitor of the saw-tooth wave generating circuit,
      and the active filter is characterized in that
      the switching transistor is turned on by trigger of a synchronizing pulse signal to hold in an ON-state, and OFF-timing of the switching transistor is determined by detecting a difference between a voltage across both terminals of an output capacitor and a reference voltage, causing a value of a level voltage to change by the difference and comparing the saw-tooth wave voltage outputted from the saw-tooth wave generating circuit, the voltage of which is raised by inputting the synchronizing pulse signal, with the level voltage as reference to keep D.C. output voltage constant.

4. An AC-DC converter comprising:

a rectifier for rectifying an A.C. input voltage supplied from a commercial power line;

an active filter for obtaining higher voltage by boosting up the level of an output voltage from the rectifier; and a DC-DC converter for supplying a stable D.C. output voltage to a load, wherein the active filter comprises:

a driving circuit for driving a switching transistor by trigger of a synchronizing pulse signal as synchronized with a switching pulse for driving the DC-DC converter; and a saw-tooth wave generating circuit without a function of self-oscillation, in which a value of the output voltage together with the turn-on of the switching transistor starts rising, in response to a signal which the driving circuit outputs when a synchronizing pulse signal is inputted thereto, and the active filter is characterized in that ON-timing of the switching transistor is determined at the time when it is triggered by the synchronizing pulse signal, OFF-timing of the switching transistor is determined by comparing a saw-tooth wave voltage outputted from the saw-tooth wave generating circuit with a level voltage as reference to keep the D.C. output voltage constant, and an inclination of the saw-tooth wave voltage changes in accordance with a difference between a voltage across both terminals of an output capacitor and a reference voltage.

5. An AC-DC converter comprising:

a rectifier for rectifying an A.C. input voltage supplied from a commercial power line;

an active filter for obtaining a higher voltage by boosting up the level of an output voltage from the rectifier; and a DC-DC converter for supplying a stable D.C. output voltage to a load, wherein the active filter comprises a control circuit including:

a saw-tooth wave generating circuit being formed by connecting a first resistor and a capacitor between electrodes of a constant voltage source in which a low potential side of the electrodes is grounded and further connecting in series a second resistor and a main current path of a first transistor across the first resistor;

an output terminal of a voltage error amplifier that outputs a voltage according to a difference between a voltage across both terminals of an output capacitor and the reference voltage being connected to a control electrode of the first transistor;

one of two input terminals of a comparator being connected to a connection point of the first resistor and the capacitor;

the other input terminal of the comparator being connected to a reference voltage source outputting a level voltage;

an output terminal of the comparator being connected to a reset input terminal of a flip-flop, a synchronizing pulse signal as synchronized with a switching pulse for driving the DC-DC converter being inputted to a set input terminal of the flip-flop; and an inverting output terminal of the flip-flop being connected to a control electrode of a second transistor, a main current flow path thereof being connected parallel to the capacitor of the saw-tooth wave generating circuit, and the active filter is characterized in that a switching transistor is turned on by trigger of the synchronizing pulse signal to hold in an ON-state, an output terminal of the flip-flop being connected to a control electrode of the switching transistor, and OFF-timing of the switching transistor is determined by detecting a difference between a voltage across both terminals of the output capacitor and the reference voltage, causing an inclination of a saw-tooth wave voltage outputted from the saw-tooth wave generating circuit to change by the difference, the voltage of which is raised by inputting the synchronizing pulse signal, and comparing the saw-tooth wave voltage with the level voltage.

* * * * *

UNITED STATES PATENT AND TRADEMARK OFFICE
CERTIFICATE OF CORRECTION

PATENT NO. : 5,436,550
DATED : July 25, 1995
INVENTOR(S) : Koji Arakawa

It is certified that error appears in the above-indentified patent and that said Letters Patent is hereby corrected as shown below:

Title page, item [75], Assignee: should read-- Toko, Inc., Tokyo, Japan--.

Signed and Sealed this

Twenty-second Day of October, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,436,550

DATED : July 25, 1995

INVENTOR(S) : Koji Arakawa

It is certified that error appears in the above-indentified patent and that said Letters Patent is hereby corrected as shown below:

Column 1, line 43, "terminl" should be --terminal--.

Column 2, line 24, "voltge" should be --voltage--.

Column 2, line 46, "become" should be --becomes--.

Column 2, line 52, "a AC-DC" should be --an AC-DC--.

Column 2, line 66, "synchronised" should be --synchronized--.

Column 3, line 4, "synchronising" should be --synchronizing--.

Column 3, line 23, "an" should be --a--.

Column 4, line 18, "rised" should be --raises--.

Column 4, line 20, "falls" should be --fall--.

Column 4, line 41, "falls" should be --causes to fall--.

UNITED STATES PATENT AND TRADEMARK OFFICE
CERTIFICATE OF CORRECTION

PATENT NO. : 5,436,550

DATED : July 25, 1995

INVENTOR(S) : Koji Arakawa

It is certified that error appears in the above-indentified patent and that said Letters Patent is hereby corrected as shown below:

Column 4, line 29, "an" should be --a--.

Column 6, line 54, "Fig. 1" should be --Fig. 6--.

Column 6, line 55, "Fig. 1" should be --Fig. 6--.

Signed and Sealed this

Fourteenth Day of January, 1997

Attest:

BRUCE LEHMAN

*Attesting Officer*  *Commissioner of Patents and Trademarks*